United States Patent [19]

Horn et al.

[11] Patent Number: 4,709,348

[45] Date of Patent: Nov. 24, 1987

[54] INTERACTIVE PAGE LENGTH ADJUSTMENT WITH AUTOMATIC PAGINATION

[75] Inventors: Gary R. Horn; Robert C. Mikelait, both of Austin, Tex.

[73] Assignee: International Business Machines Corporation, Armonk, N.Y.

[21] Appl. No.: 873,753

[22] Filed: Jun. 13, 1986

[51] Int. Cl.⁴ .............................................. G06F 9/00
[52] U.S. Cl. ................................................... 364/900
[58] Field of Search ............................ 364/200, 900

[56] References Cited

U.S. PATENT DOCUMENTS 4,417,322 11/1983 Berry et al. .......................... 364/900
4,498,150 2/1985 Gaudet et al. ....................... 364/900

OTHER PUBLICATIONS

*IBM DisplayWrite 1 User's Guide*, Mar. 1984, International Business Machines Corporation, pp. 4-12, 4-13, 6-32, 6-38 and 6-39.

*IBM Writing Assistant*, First Edition (May 1984) International Business Machines Corporation, Software Publishing Corporation, "Chapter 7. Changing the Page Layout", pp. 7-1-7-9.

*PFS: Write User's Manual*, Barbara Langworthy, first printing, Sept. 1984, Software Publishing Corporation, Mountain View, CA 94043, "Changing the Page Layout", pp. 6-1-6-10.

*Primary Examiner*—Thomas M. Heckler
*Assistant Examiner*—John G. Mills
*Attorney, Agent, or Firm*—Douglas H. Lefeve

[57] ABSTRACT

A comprehensive pagination facility is described which combines an automatic pagination function with an interactive paginate function. With this technique the operator is allowed to insert both Page End and Required Page End controls, although the automatic pagination function makes page ending decisions during both the creation and revision of text. The operator can then interactively paginate the document while being allowed to view each page ending decision and optionally accept the page break location or reposition the suggested page break location to a different line on the page.

7 Claims, 3 Drawing Figures

INTERACTIVE PAGE LENGTH ADJUSTMENT WITH AUTOMATIC PAGINATION

DESCRIPTION

TECHNICAL FIELD

This invention relates to word processing systems in general and more particularly to a technique dynamically adjusting page boundaries during the creation or revision of a text job while accommodating an interactive page length adjustment process.

BACKGROUND ART

One of the inherent problems in computer systems, from the end user's standpoint, is the trade-off between ease of use (useability) and function (power). Product positioning for programmed computer systems is often illustrated as a two dimensional graph showing useability versus power. The challenge to the developer of computer systems, and in particular, the software, is to maximize both useability and power.

In word processing programs, this problem is illustrated in the variety of methods used to divide a text document into pages. Some word processing programs have attempted to optimize useability, while allowing the user little control or flexibility in determining the location of page breaks. Other word processing programs have attempted to give the user complete control over the location of page breaks, but as a result of this operator control, require extra work on the part of the operator for even the simplest of situations. As will be described in detail below, the technique of this invention provides the user with an easy to use function that does not sacrifice the complete control that the user may require.

The IBM DisplayWrite 1 word processing program is based on an IBM datastream known as the Revisable Form Text Document Control Architecture (RFTDCA). This datastream defines two control characters: Page End and Required Page End. A Page End control ends a page (causes a page break). A Required Page End control has no effect on page breaks. It must be followed by a Page End. It is used to indicate to a "Paginate" function where a page should be ended. A Paginate function is defined as a function that adjusts page breaks. The number of lines placed on each page is based on the size of the text typing area for the page (the page length less the top and bottom margin area).

DisplayWrite 1 provides the user with the following functions:

1. The ability to insert a Page End control (thus ending the current page and causing subsequent text to begin on a new page).

2. The ability to insert a Required Page End control.

3. An Interactive Paginate function, which automatically makes page ending decisions based on the line count for each page or the occurrence of a Required Page End control, and allows the user to view each page ending decision and optionally accept the page break location or reposition the page break location higher or lower on the page. The Interactive Paginate function repositions Page End controls to the accepted page break locations. The user can avoid widow lines (a situation in which the first line of a new paragraph appears as the last line on a page) and orphan lines (a situation in which the last line of a paragraph is the first line of a page) by repositioning the page break up or down one or more lines before accepting the page break location. The Interactive Paginate function always keeps blank lines at the end of a paragraph on the same page as the paragraph (a blank line is never placed as the first line on a page).

These functions allow the user complete control over the page breaks in a document, but have several limitations that affect the useability of the program. First, as the user creates a new document, if he wishes to view the page breaks as he is typing, he must manually insert Page End codes at the appropriate locations. A user may type an entire document without entering any page breaks, but in this case the user must subsequently perform the Interactive Paginate function. The program does not have the capability to automatically make page ending decisions.

Second, to effectively force a short page, the user must insert a Required Page End control and a Page End control, since the Recuired Page End control does not cause a page break by itself.

Additionally, when the document is revised, the user must either manually move each Page End control to readjust page breaks, or perform the Interactive Paginate function again. Page breaks are not automatically adjusted by the program.

The IBM Writing Assistant word processing program is not based on the RFTDCA datastream. It implements a New Page control that has the semantics of a Page End.

Writing Assistant provides the user with the ability to insert a New Page control (thus ending the current page and causing subsequent text to begin on a new page). Additionally Writing Assistant provides an Automatic Paginate function, which automatically makes page ending decisions based on the line count for each page or the occurrence of a New Page control, and causes subsequent text to be placed on the next page. No adjustment is made for blank lines appearing at the top of a page, or widow or orphan lines appearing at the bottom of a page.

These functions automatically handle the pagination for the user, and thus for a user with no more functional requirements, are very easy to use. However, they give the user very little control over the page breaks in a document, and have several functional limitations. First, to prevent widow lines from appearing at the bottom of a page, or to avoid splitting a table or logically related set of lines over two pages, the user must place a New Page control in the document. Since there is no Paginate function that will reposition a New Page control, if the document is subsequently revised, the user must manually remove such controls that are no longer appropriate.

Second, to control the placement of blank lines at the top of a page, the user must delete any blank lines following the paragraph on the preceding page. If the document is subsequentlv revised, the user must manually go back and insert the blank lines between the paragraphs.

It would, therefore, very significantly increase the useability and power of a word processing system to provide both an automatic pagination function, operative during document creation and revision, and an interactive page length adjustment function which allows the automatic replacement of user inserted page end controls.

DISCLOSURE OF THE INVENTION

Accordingly, this invention achieves a synergism of these two approaches, keeping the high ease of use associated with the Automatic Paginate function, and the power and control of the Interactive Paginate function. With this new technique the user is provided with the following functions:

1. The ability to insert a Page End control (thus ending the current page and causing subsequent text to begin on a new page).

2. The ability to insert a Required Page End control. The semantics of the Reouired Page End control are redefined as follows: the control ends a page (causes a page break) just as a Page End control, and is never moved or deleted by a Paginate function.

3. An Automatic Paginate function, which automatically makes page ending decisions based on the line count for each page or the occurrence of a Page End control or Required Page End control, and causes subsequent text to be placed on the next page. The Automatic Paginate function always keeps blank lines at the end of a paragraph on the same page as the paragraph (a blank line is never placed as the first line on a page).

4. An Interactive Paginate function, which automatically makes page ending decisions based on the line count for each page or the occurrence of a Required Page End control, and allows the user to view each page ending decision and optionally accept the page break location or reposition the page break location hiqher on the page. The Interactive Paginate function deletes Page End controls, and only leaves Page End controls in the document if the accepted page break location is not the default (the location used by the Automatic Paginate function).

The new method provides both superior ease of use characteristics and power to a word processing program by: (1) automatically handling blank lines at the end of a page in the Automatic Paginate function, (2) treating a Required Page End control as causing a page break, and (3) having the Interactive Paginate function remove Page End controls that are not necessary (because they fall at the point where the Automatic Paginate function will cause a page break without them).

The foregoing and other objects, features, extensions, and advantages of the invention will be apparent from the following more particular description of a preferred embodiment of the invention, as illustrated in the accompanying drawing.

BEST MODE FOR CARRYING OUT THE INVENTION

Figure 1:
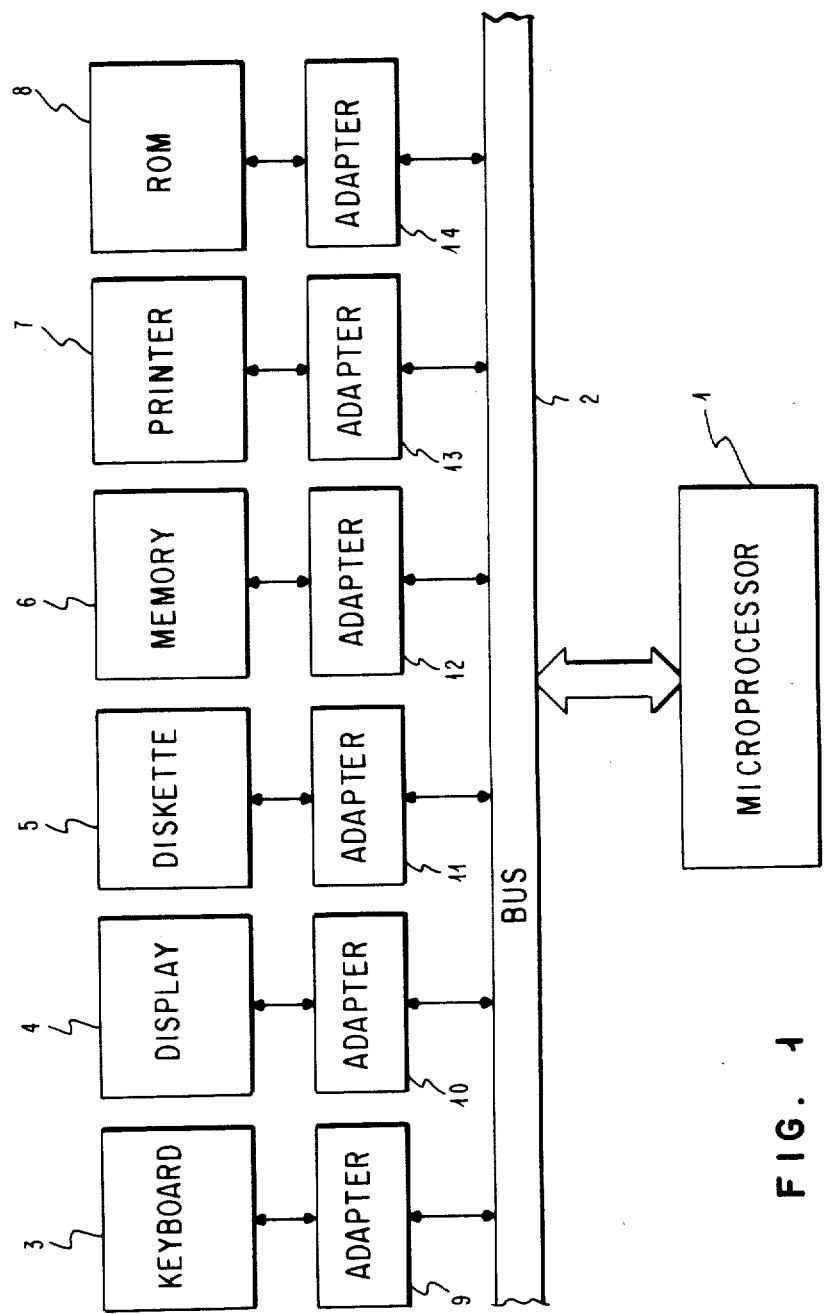
FIG. 1 is a block diagram of a data processing system which includes a stored program for performing word processing functions including the functions of this invention.

Beginning with reference to the block diagram of FIG. 1, a typical personal computer architecture is shown, such as the configuration used in the IBM Personal Computer. The focal point of this architecture comprises a microprocessor 1 which may, for example, be an Intel 8088 or similar microprocessor. The microprocessor 1 is connected to a bus 2 which comprises a set of data lines, a set of address lines and a set of control lines. A plurality of I/O devices or memory or storage devices 3-8 are connected to the bus 2 through separate adapters 9-14, respectively. For example, the display 4 may be the IBM Personal Computer Color Display and the adapter 10 may, accordingly, be the IBM Color/Graphics Adapter. The other devices 3 and 5-8 and adapters 9 and 11-14 are either included as part of an IBM Personal Computer or are available as plug-in options from the IBM Corporation. For example, the random access memory 6 and the read-only memory 8 and their corresponding adapters 12-14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Personal Computer Series Disk Operating System by Microsoft Corporation, or DOS, most commonly used with the IBM Personal Computer family, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6.

An application program such as the IBM DisplayWrite 1 word processing program may also be loaded into the memory 6 to provide instructions to the microprocessor 1 to enable a comprehensive set of word processing tasks, including the creation and revision of text documents, along with the automatic paginate and interactive paginate functions of this invention, to be performed by the personal computer system shown in FIG. 1. An application program loaded into the memory 6 is said to run in conjunction with the disk operating system previously loaded into the memory 6.

Figure 2:
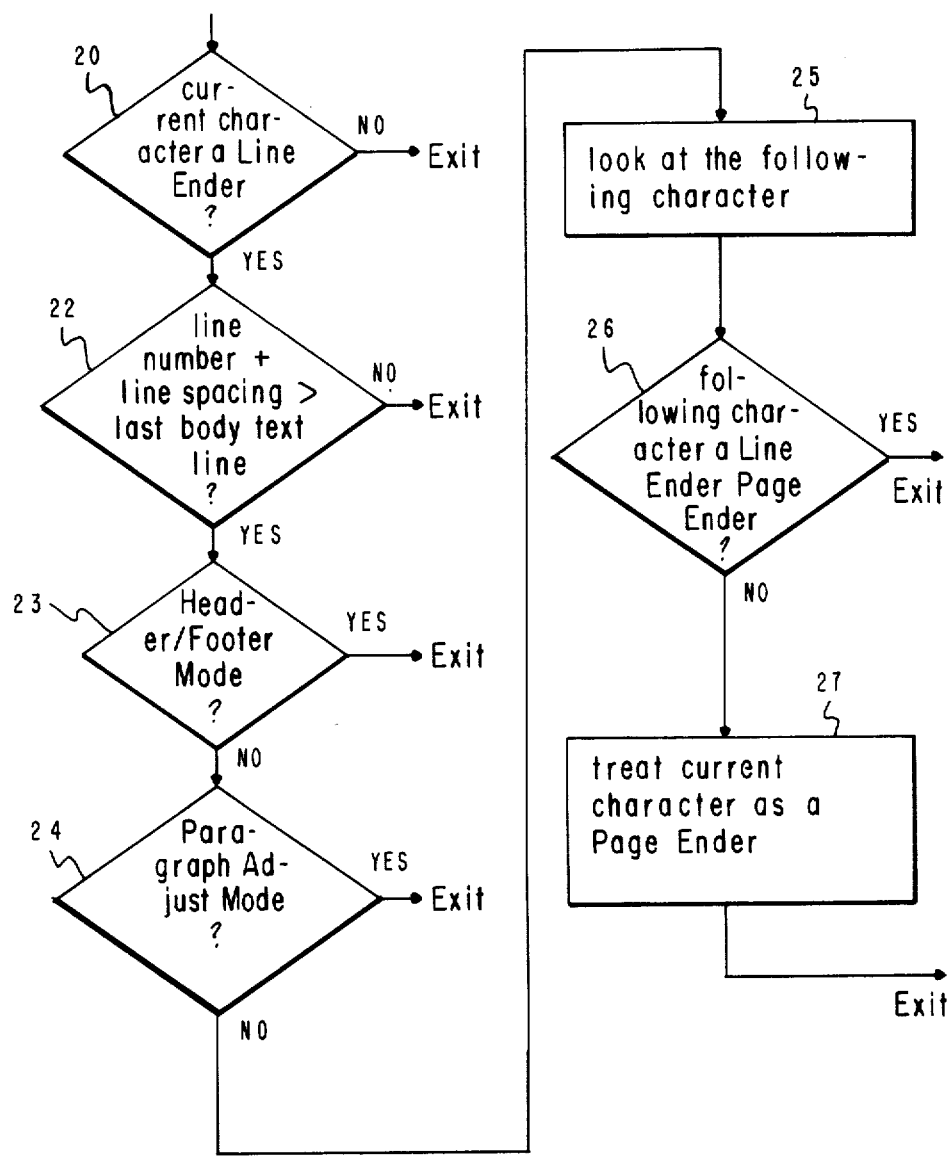
FIG. 2 is a flow diagram of the operations included in the automatic pagination function of this invention.

Refer now to FIG. 2 for a description of the flow diagram of the operations included in the automatic pagination function of this invention. The operation begins by a test at block 20 to determine if a current character in the text being tested is the type of control code which can be used to end a line. If not, this automatic pagination process is exited at this point, since a page must end at a line boundary. If the character being tested at block 20 is the tvpe of control which may be used to end a line, the operation proceeds to block 22 wherein a test is made to determine if the line number plus the line spacing is greater than the last body text line, which is a preset page format value based on the page length less the bottom margin area. If not, the process is exited since this test indicates that the next line of text will fit on the current page.

If, at block 22 the line numher plus line spacing exceeds the last body text line then the operation proceeds to block 23 to determine if the line ender is detected while in a header or footer mode. If so, the process exits, since there cannot be multiple pages in a header or footer. If not, the operation proceeds to block 24 wherein a test is made to determine if a paragraph adjust routine is in progress. If so, the process exits to allow the paragraph adjust routine to complete the adjustment of the paragraph even if the paragraph will end up being split between two pages. This will prevent the situation which could otherwise exist of having the line lengths adjusted for a paragraph until the end of the page is reached and then displaying the remainder of the paragraph without properly adjusted line lengths on the following page.

Assuming at block 25 that the system is not in the paragraph adjust mode, the operation then proceeds to block 25 wherein the character following the control tested above is examined. This character being examined at block 25 is the first character of the succeeding line of text. If this character is the type of control code that can be used to end a line or a page, the process is exited at this point to avoid placing blank lines at the top of a page. If however, this character is not a line ender or page ender, at block 27 the current character is subsequently treated as a page ender to cause a page break at this point and the process is exited. The character following the current character treated as a page ender at block 27 becomes the beginning character on the following page.

The following programming design language listing is another form of the description of the above described automatic pagination process. This listing parallels the operation described above relative to FIG. 2.

```
If the current character is a Line Ender
    and
    line number + line spacing > last body text line
    and
    not Header/Footer Mode
    and
    not Paragraph Adjust Mode
    and
    the following character is not a Line Ender or a Page
        Ender
then
    treat the current character as a Page Ender
```

Figure 3:
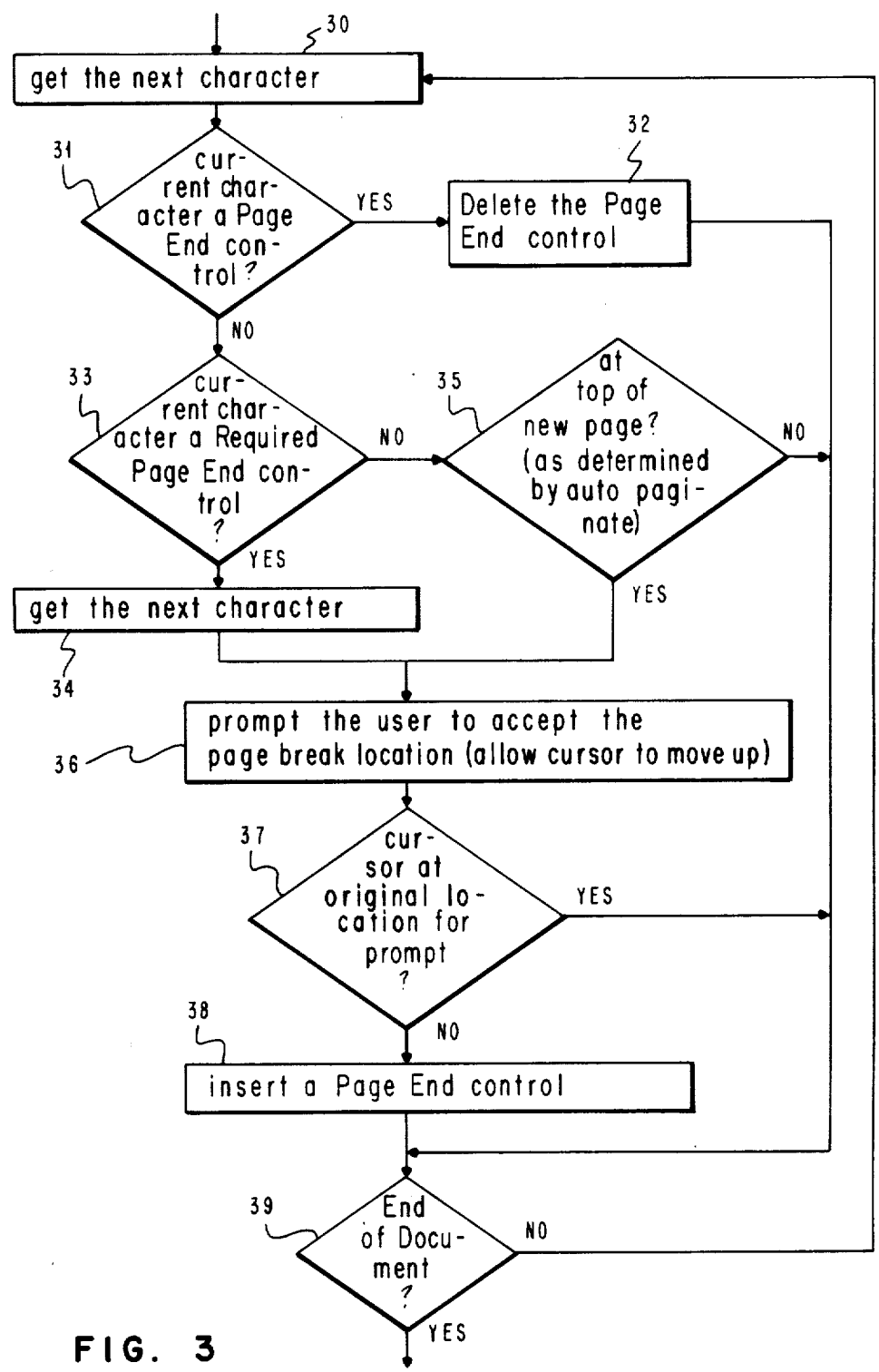
FIG. 3. is a flow diagram of the operations included in the interactive paginate function of this invention.

FIG. 3 is a flow diagram of the operations included in the interactive paginate function of this invention. At block 30 a next character in the document is obtained. At block 31 a test is made to determine if this next character is a Page End control code. If the character is a Page End control code, this control code is deleted at block 32 and the operation proceeds to block 39 to determine if the end of the document has been reached. If not, the operation loops back to block 30 for a next character to be tested. It will be understood that the Page End control code is deleted at this point, because the automatic pagination function described above is utilized to determine page breaks which are utilized by the interactive paginate function to automatically suggest page ending points.

At block 31, assuming that the character being tested is not a Page End control code, the operation proceeds to block 33 wherein a test is made to determine if the character is a Required Page End control code. If not, at block 35 a test is made to determine if the character is to be placed at the heginning of a new page, as described relative to the final phase of the automatic pagination function, descrihed above. If the character is not one to be positioned at the top of a new page, the operation again proceeds to block 39, whereby the operation is directed back to block 30, assuming the end of the document has not been reached.

If, at block 35 the currently tested character is to be positioned at the top of a new page, the operation proceeds to block 36 and the user is prompted to accept the page break location. At this point the operator has two choices. The prompted and suggested page break location can be accepted, or the cursor can be moved up to end the page with less lines than currently make up the page being displayed to the operator. If the operator chooses to end the page at the originally prompted location, then the operation proceeds from block 37 to block 39. If the operator moves the cursor, the operation proceeds through block 38 wherein a Page End control code is inserted in the text datastream at the new cursor location.

Accordingly, it will be understood that in those cases in which the operator chooses to accept the prompted page break location, no Page End control code is inserted in the text datastream. If such a Page End control code was stripped out of the text datastream at block 32, it is not reinserted at block 38 unless the reinsertion is in response to the operator's moving the cursor up from the prompted cursor location to a higher position on the page.

At block 33, if the current character being considered is a Required Page End control code, then at block 34 the following character is considered. The user is then prompted to accept this page break location, in which case no additional page end control code will be inserted into the text datastream. However, if, as described above, the operator moves the cursor to a higher position on the page, then a Page End control code is inserted at block 38.

The following programming design language is another form of the above description of the interactive paginate function of this invention. This listing parallels the operation described above relative to FIG. 3.

```
do
    get the next character
    if the current character is a Page End control
    then Delete the Page End control
    else
        if the current character is a Reouired Page End
            control
        or
        we are not at the top of a new page (as determined
            by automatic paginate
    then
        if the current character is a Required Page
            End control
        then get the next character
        prompt the user to accept the page break location
            (allow cursor to move up)
        if cursor is not at the original location for the
            prompt
        then insert a Page End control
until End of Document
```

In summary, a comprehensive pagination facility has been described which combines the high ease of use associated with an automatic pagination function and the power and control of an interactive paginate function. With this technique the operator is allowed to insert both Page End and Required Page End controls, although an automatic pagination function makes page ending decisions during both the creation and revision of text. The operator can then interactively paginate the document while being allowed to view each page ending decision and optionally accept the page break location or reposition the paoe break location higher on the page.

While the invention has been shown and described with reference to particular embodiments thereof, it will be understood by those skilled in the art that the foregoing and other changes in form and details may be made therein without departing from the spirit and scope of the invention.

What is claimed is:

1. In a word processing system with a video display for operator review of input text data said system having a processor, a memory for storing said text data, and a word processing program to control said processing, the improved method for editing and adjusting the length of text pages comprising:

automatically ending a page responsive to a preset line count during creation of said page;

ending said page shorter than said automatic ending upon operator entry of a page end control code during said creation of said page; and automatically deleting said page end control code during a subsequent page length editing adjustment operation after said creation of said page when said page end control code is positioned on said page prior to said preset line count, whereby text editing of page length may be automatically updated prior to printing to correct operator inserted page and control codes during text entry.

2. The method of claim 1 further comprising:

ending said page shorter than said automatic ending upon operator entry of a required page end control code during said creation of said page; and retaining said required page end control code during said page length adjustment operation subsequent to said creation of said page.

3. The method claim 1 wherein said step of automatically ending a page further comprises:

including blank lines between paragraphs on the same page as the paragraph which precedes the blank lines.

4. The method of claim 3 wherein said page length adjustment operation further comprises:

displaying a suggested page ending location responsive to said preset line count.

5. The method of claim 4 wherein said page length adjustment operation further comprises:

including blank lines between paragraphs on the same page as the paragraph which precedes the blank lines.

6. The method of claim 5 wherein said page length adjustment operation further comprises:

ending said text pages without a page end control code when said displayed, suggested page ending location is accepted as a page ending location by an operator.

7. The method of claim 6 wherein said page length adjustment operation further comprises:

ending said text pages with a page end control code when said operator chooses a different page ending location from said displayed, suggested page ending location.

* * * * *